United States Patent

Pataki et al.

[15] 3,635,098

[45] Jan. 18, 1972

[54] SHAFT POSITIONING APPARATUS

[72] Inventors: Andrew B. Pataki, Lansdale, Pa.; Richard F. Perry, North Andover, Mass.

[73] Assignee: Sperry Rand Corporation, New York, N.Y.

[22] Filed: Dec. 24, 1969

[21] Appl. No.: 887,871

[52] U.S. Cl. ....74/110

[51] Int. Cl. ....F16h 21/44

[58] Field of Search ....74/110, 567, 89.15, 568; 346/86; 179/100.2 CA, 100.2 MD

[56] References Cited

UNITED STATES PATENTS

| | | | |
|---|---|---|---|
| 2,648,234 | 8/1953 | Lester | 74/110 |
| 2,484,331 | 10/1949 | Bels | 74/568 |
| 2,999,902 | 9/1961 | Swartz | 74/110 |
| 1,348,851 | 8/1920 | Cook | 74/110 |
| 2,084,097 | 6/1937 | Long | 346/86 |
| 2,319,322 | 5/1943 | Hefel | 74/110 |
| 2,791,871 | 5/1957 | Johnson | 74/110 |
| 3,153,630 | 10/1964 | Green | 74/110 |
| 3,279,799 | 10/1966 | Proctor | 179/100.2 |
| 3,084,337 | 4/1963 | Willard | 179/100.2 |

*Primary Examiner*—William F. O'Dea
*Assistant Examiner*—Wesley S. Ratliff, Jr.
*Attorney*—Charles C. English, Leonard Zalman and William E. Cleaver

[57] ABSTRACT

Shaft positioning apparatus including a ramp member in supporting relation to an interposer cam which, by moving from its original position in a direction substantially transverse to the axis of the shaft, lifts the shaft from contact with a step of a shaft-supporting and positioning stepped surface of the ramp member thereby allowing the ramp member to move so that a different step of the stepped surface supports and positions the shaft when the interposer cam is returned to its original position. The ramp member is moved by a pinion drive which engages a gear rack formed on a surface of the ramp member.

11 Claims, 3 Drawing Figures

INVENTORS
ANDREW B. PATAKI
RICHARD F. PERRY
BY Leonard D. Zalman
ATTORNEY

SHAFT POSITIONING APPARATUS

Closed-loop servosystems and open-loop apparatuses have been developed to achieve accurate positioning of a shaft member. Closed-loop servosystems are unsatisfactory for that purpose because these systems require the use of several rather costly feedback transducers and compensation networks. Conventional open-loop apparatuses are also unsatisfactory for accurate shaft positioning because these apparatuses require several parts that must satisfy close manufacturing tolerances.

In a copending U.S. patent application of Andrew B. Pataki, entitled "Shaft Positioning Apparatus," Ser. No. 886,226, filed Dec. 18, 1969, filed concurrently with this application, there is disclosed and claimed a low cost, open-loop shaft positioning apparatus which includes a spiral cam and an interposer cam for locating a shaft member in contact with the curved, stepped surface of a shaft-supporting and positioning cam. Since the configuration of the stepped surface, and not the exact orientation of the driving mechanism for the cam, is solely determinative of the position of the shaft, only the stepped surface must satisfy close manufacturing tolerances. That apparatus has the disadvantage that the circumferential dimension of the curved, stepped limits the number of steps that can be formed on the surface and accordingly limits the number of shaft positions.

Accordingly, an object of the present invention is to provide an improved shaft positioning apparatus.

Another object of the present invention is to provide a low-cost shaft positioning apparatus.

A further object of the present invention is to provide a shaft positioning apparatus which is not dependent for accuracy on the exact position of the driving mechanism for the shaft-supporting member of the apparatus.

A further object of the present invention is to provide a shaft positioning apparatus which does not require several parts having close manufacturing tolerances.

In accordance with the invention, the shaft positioning apparatus includes a movable stepped ramp, a spring-loaded shaft member normally having one end in contact with a step of the stepped ramp, and an interposer cam having a section supported by a ledge of the stepped ramp and shaped such that movement of the interposer cam in one direction lifts the shaft member from the step of the stepped ramp. Lifting of the shaft member permits the stepped ramp to move without contacting the shaft member such that subsequent movement of the interposer cam in the opposite direction positions the shaft member on a different step of the stepped ramp.

In a preferred embodiment of the invention, the section of the interposer cam is substantially wedge-shaped and has a longitudinal slot cut therein to provide for tracking of this section along the stepped ramp. In this embodiment, the interposer cam moves in response to movement of the armature of a high-speed solenoid.

For a better understanding of the invention together with other and further objects thereof, reference should be had now to the following detailed description which is to be read in conjunction with the accompanying drawing in which.

Figures 1, 2, 3:
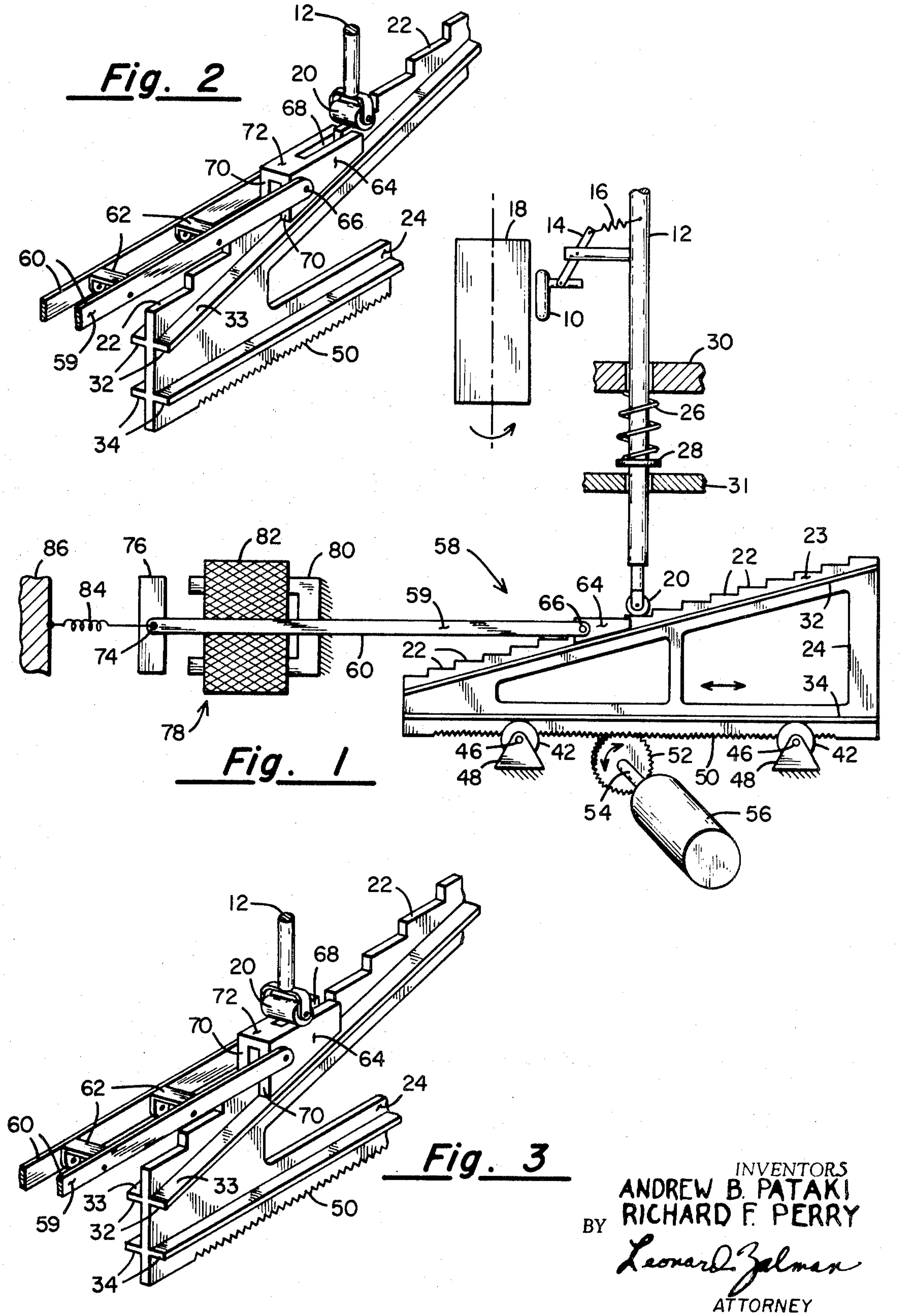
FIG. 1 is a side elevation view of an assembly embodying a preferred form of the shaft positioning apparatus of the invention.
FIG. 2 is a perspective view from the top of a portion of the assembly of FIG. 1 at one state of the operation of that assembly.
FIG. 3 is a perspective view from the top of a portion of the assembly of FIG. 1 at another state of the operation of that assembly.

Although the shaft positioning apparatus of the invention can be used to position a wide variety of devices mounted on a shaft member, it is particularly useful in positioning the transducer head of a computer system. Accordingly, the invention is described in the environment of a computer system.

Referring now to the drawings and more particularly to FIG. 1, a transducer head 10 is attached to a shaft member 12 by a linkage 14 which is biased by a spring 16 to maintain transducer head 10 adjacent a conventional magnetic storage drum 18. Transducer head 10 is connected electrically to suitable conventional apparatus (not shown) which either supplies electrical signals to transducer head 10 or receives electrical signals from transducer head 10. Drum 18 characterized by a plurality of tracks (not shown) of information recorded magnetically around its periphery. To record information on or retrieve information from a selected track on drum 18, transducer head 10 is positioned, by movement of shaft member 12, in the manner described in detail hereinafter, adjacent the selected track.

A roller 20, carried by shaft member 12 at the lower end thereof, is maintained in contact with one of the flat horizontal steps 22 of a stepped surface 23 formed on the upper surface of a substantially triangular-Shaped ramp member 24 by a compressed spring 26 situated between shoulder 28 of shaft member 12 and a stationary frame member 30. Frame member 30 and another stationary frame member 31 maintain shaft member 12 in a vertical position.

As clearly shown in FIGS. 2 and 3, ramp member 24 has a pair of inclined ledges 32 and a pair of horizontal ledges 34 aligned below ledges 32. Ledges 34, and accordingly ramp member 24, are supported by support bearings 42 which in turn are supported by and free to rotate about pins 46 attached to stationary frame members 48. The lower surface of ramp member 24 has formed thereon a horizontal gear rack 50 which is meshed with a pinion gear 52. Gear 52 is carried by the drive shaft 54 of a conventional stepping motor 56 which, in response to an appropriate signal supplied thereto, moves gear 52 in either a clockwise direction or a counterclockwise direction, accordingly moving ramp member 24 horizontally to either the right or the left.

The number of steps 22 of surface 23 is equal to the number of recording tracks on drum 18 and the vertical distance between adjacent steps 22 differs by an amount equal to the spacing between those tracks. For example, if drum 18 has 200 tracks spaced four hundredths of an inch apart, ramp 24 will contain 200 steps each two tenths of an inch wide with the vertical distance between adjacent steps 22 differing by four hundredths of an inch.

MOvement of shaft member 12 from one of the steps 22 to another of these steps is accomplished by an interposer cam 58 which includes a linkage section 59 defined by plates 60 and cross braces 62 and a substantially wedge-shaped section 64 pivotally connected to a linkage section 59 by a pin 66. Wedge-shaped section 64 has therein a longitudinal slot 68 which guides this section along ramp member 24. Slot 68 defines legs 70 which rest slidably on the upper surfaces 33 of inclined ledges 32. As clearly shown in FIG. 2, the upper surface 72 of wedge-shaped section 64 has about the same width as roller 20 and is normally adjacent to, but out of contact with, roller 20. Inclined ledges 32 have a slope equal to the rate at which the stepped surface 23 increases in height. More particularly, for the example previously set forth, the slope of inclined ledges 32 would be 0.04 inch elevation per 0.2 inch horizontal ramp displacement. The height of the central portion of wedge-shaped section 64 is such that when roller 20 is supported by this portion the sum of the height of this portion of section 64 and the height between ledges 32 and 34, both measured along the projected longitudinal axis of shaft member 12, is greater than the height between the step under roller 20 and a ledge 34, also measured along the projected longitudinal axis of shaft member 12, by about one half the height between adjacent steps 22. Since it is required that surface 72 of wedge-shaped section 64 remain substantially horizontal, the slope of the bottom surface of section 64 must have the same slope as ledges 32.

The end of linkage section 59 of interposer cam 58 remote from wedge-shaped section 64 is secured pivotally by a pin 74 to the armature 76 of a high speed solenoid 78 which also includes a stationary U-shaped iron core 80 and energizing coils 82. To maintain armature 76 remote from core 80 when coils 82 are unenergized, a tensioned spring 84 is secured between pin 74 and a stationary frame member 86.

Storage and retrieval of information from a selected track of drum 18 is initiated by supplying an input signal to coils 82. THis signal produces a magnetic field which moves armature 76 to the right and into contact with core 80. This movement causes interposer cam 58 to move to the right (to the position shown in FIG. 3) resulting in the positioning of roller 20 on the central portion of surface 72 of wedge-shaped section 64. Since roller 20 is supported now by the central portion of wedge-shaped section 64, roller 20 is maintained out of contact with steps 22 during movement of ramp member 24. Ramp member 24 now is moved, by supplying an appropriate signal to motor 56, to a position which situates roller 20 above the step 22 that will position head 18 adjacent the selected track when roller 20 is in contact with this step of stepped surface 23. When the movement of ramp member 24 is completed, coil 82 is deenergized whereby, through the action of tension spring 84, armature 76 and interposer cam 58 are moved to the left and into their normal position (the position shown in FIG. 2). As cam 58 moves to the left, roller 20 comes into contact with the desired step of stepped surface 23 thereby situating transducer head 10 adjacent the selected track on drum 18.

From the foregoing, it is apparent that placement of transducer head 10 by shaft member 12 adjacent a selected track of drum 18 is not dependent upon moving ramp member 24 to an exact position. If the movement of ramp member 24 situates roller 20 on any portion of a selected step 22, transducer head 10 will be positioned adjacent the track on drum 18 corresponding to that step. Accordingly, accurate positioning of transducer head 10 can be achieved by the apparatus of the present invention without costly closed-loop servo systems. Since the configuration of ramp member 24 is solely determinative of the position of transducer head 10 adjacent drum 18, only ramp member 24 need be held to close manufacturing tolerances. Furthermore, since stepped surface 23 is linear, there is no limit practically to the number of steps 22 that can be formed on surface 23 of ramp member 24 and hence no limit practically to the number of positions of shaft member 12.

While the invention has been described with reference to particular embodiments thereof, various modifications can be made without departing from the invention. For example, to prevent excessive wearing of the stepped surface 23, roller 20, and wedge-shaped section 64, surface 72 of wedge-shaped section 64 can be contoured such that roller 20 contacts both this surface and stepped surface 23 with minimum impact. In addition, the lower surface of wedge-shaped section 64 can be contoured to reduce sliding friction between this section and the ledges of ramp member 24 supporting it.

I claim:

1. Shaft positioning apparatus comprising a movable ramp member having a stepped surface which normally supports a shaft member, an interposer cam having a section supported by a portion of the ramp member other than said stepped surface, first means coupled to said interposer cam for sliding said section of said interposer cam between first and second positions along said portion of said ramp member said section of said interposer cam supporting the shaft member when said section is in said first position, and second means for moving said ramp member only when said section of said interposer can is in said first position.

2. The apparatus according to claim 1 wherein said portion of said ramp member is at least one ledge formed on said ramp member, said ledge having a slope approximately equal to the increase in unit height of said stepped surface per unit length of said stepped surface.

3. The apparatus according to claim 2 wherein said second means comprises a gear rack formed on a surface of said ramp member and a motor-driven pinion drive meshed with said gear rack.

4. The apparatus according to claim 3 wherein said section of said interposer cam is connected pivotally to the remainder of said interposer cam so that said surface of said section of said interposer cam is always in contact with said ledge.

5. A shaft positioning apparatus comprising a movable ramp member having a stepped surface, a shaft member having one end normally supported by said stepped surface, first means supported partially by a portion of said ramp member other than said stepped surface and shaped such that it lifts said shaft member from its normal support when in a first position but not when in a second position, second means coupled to said first means for moving said first means into either said first position or said second position, and third means for moving said ramp member when said first means is in said first position. linearly when said first means is in said first position.

6. The apparatus according to claim 5 wherein said stepped surface is substantially linear.

7. The apparatus according to claim 6 wherein said first means is an interposer cam having a wedge-shaped section supported by said portion of said ramp member, said wedge-shaped section is shaped such that it does not contact the steps of said stepped surface.

8. The apparatus according to claim 7 wherein said portion of said ramp member consists of ledges formed on two sides of said ramp member, and said wedge-shaped section includes leg portions in contact with said ledges both for slidably supporting said wedge-shaped section and guiding said wedge-shaped section along a path adjacent said stepped surface.

9. The apparatus according to claim 8 wherein said ledges have a slope approximately equal to the increase in unit height of said stepped surface per unit length of said stepped surface.

10. The apparatus according to claim 8 wherein said third means comprises a gear rack formed on a surface of the ramp member and a motor-driven pinion drive meshed with said gear rack.

11. The apparatus according to claim 8 wherein said second means comprises a high speed solenoid having its armature connected to said interposer cam and a tensioned spring connected between a stationary member and said armature.

* * * * *